(12) United States Patent
Morita

(10) Patent No.: US 9,924,496 B2
(45) Date of Patent: Mar. 20, 2018

(54) NETWORK APPARATUS AND USER TERMINAL

(71) Applicant: KYOCERA CORPORATION, Kyoto (JP)

(72) Inventor: Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/914,241

(22) PCT Filed: Aug. 25, 2014

(86) PCT No.: PCT/JP2014/072177
§ 371 (c)(1),
(2) Date: Feb. 24, 2016

(87) PCT Pub. No.: WO2015/029952
PCT Pub. Date: Mar. 5, 2015

(65) Prior Publication Data
US 2016/0212730 A1    Jul. 21, 2016

(30) Foreign Application Priority Data

Aug. 26, 2013 (JP) ................................. 2013-174322

(51) Int. Cl.
*H04W 72/02* (2009.01)
*H04W 72/12* (2009.01)
(Continued)

(52) U.S. Cl.
CPC ........... *H04W 72/02* (2013.01); *H04W 8/005* (2013.01); *H04W 72/1231* (2013.01);
(Continued)

(58) Field of Classification Search
CPC .... H04W 72/04; H04W 72/02; H04W 72/085
See application file for complete search history.

(56) References Cited

U.S. PATENT DOCUMENTS

| | | | |
|---|---|---|---|
| 2005/0014467 A1* | 1/2005 | Ishiwata ............... | H04W 84/20 455/39 |
| 2012/0106517 A1* | 5/2012 | Charbit ................. | H04W 72/04 370/336 |

(Continued)

OTHER PUBLICATIONS

International Search Report issued in PCT/JP2014/072177; dated Oct. 7, 2014.

(Continued)

*Primary Examiner* — Muthuswamy Manoharan
(74) *Attorney, Agent, or Firm* — Studebaker & Brackett PC

(57) ABSTRACT

A network apparatus comprises a transmitter configured to transmit a search request for a surrounding user terminal, to a plurality of user terminals; a receiver configured to receive a search result for the surrounding user terminal based on the search request; and a controller configured to determine, on the basis of the search result, a scheduling terminal that performs an assignment of a radio resource used for the D2D communication, from among the plurality of user terminals. The transmitter transmits, to a user terminal determined as the scheduling terminal, a scheduling terminal request to request that the user terminal acts as the scheduling terminal.

12 Claims, 11 Drawing Sheets

(51) Int. Cl.
*H04W 76/02* (2009.01)
*H04W 8/00* (2009.01)
H04W 8/08 (2009.01)
H04W 92/18 (2009.01)
H04W 72/04 (2009.01)

(52) U.S. Cl.
CPC .......... *H04W 76/023* (2013.01); *H04W 72/04* (2013.01); *H04W 72/1284* (2013.01); *H04W 92/18* (2013.01)

(56) References Cited

U.S. PATENT DOCUMENTS

2014/0334435 A1\* 11/2014 Al-Shalash ........... H04W 8/005 370/330
2016/0057604 A1\* 2/2016 Luo ....................... H04W 8/005 370/330

OTHER PUBLICATIONS

Written Opinion issued in PCT/JP2014/072177; dated Oct. 7, 2014.
3rd Generation Partnership Project; Technical Specification Group Services and System Aspects; Feasibility study for Proximity Services (ProSe); 3GPP TR 22.803; V12.1.0; Mar. 2013; pp. 1-45; Release 12; 3GPP Organizational Partners.

\* cited by examiner

NETWORK APPARATUS AND USER TERMINAL

TECHNICAL FIELD

The present invention relates to a network apparatus and a user terminal in a mobile communication system that supports D2D communication.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Literature 1).

In the D2D communication, a plurality of adjacent user terminals perform direct device-to-device communication without passing through a network. On the other hand, in cellular communication which is normal communication in a mobile communication system, a user terminal performs communication through a network.

It is noted that cases are assumed where assignment of a radio resource used for the D2D communication is led by a network apparatus such as a base station and the assignment thereof is led by a user terminal that performs the D2D communication. As a result of the user terminal itself performing the D2D communication assigning the radio resource, it is possible to reduce a load of the base station.

In the case where the assignment of the radio resource used for the D2D communication is led by the user terminal, a case is assumed where there are a plurality of D2D groups to which a user terminal that assigns the radio resource (hereinafter, "scheduling terminal") and a user terminal to which the radio resource is assigned (hereinafter, "non-scheduling terminal") belong. In this case, the non-scheduling terminal that belongs to the plurality of D2D groups and performs the D2D communication is assigned the radio resource from each scheduling terminal belonging to each D2D group. Generally, the scheduling terminals respectively independently assign the radio resource, and thus, the radio resources assigned to the non-scheduling terminals may overlap to cause trouble in the D2D communication.

Further, even when the non-scheduling terminal is not assigned the radio resource from the plurality of scheduling terminals, if a plurality of D2D groups mixedly exist, then the overlapping of the radio resources assigned by the plurality of scheduling terminals may still cause trouble in the D2D communication. In particular, the larger the number of D2D groups, that is, the larger the number of scheduling terminals, the higher the possibility that the radio resources overlap.

CITATION LIST

Non Patent Literature

[NPL 1] 3GPP technical report "TR 22.803 V12.1.0" March, 2013

SUMMARY OF INVENTION

A network apparatus according to one embodiment is a network apparatus in a mobile communication system that supports D2D communication that is direct device-to-device communication. The network apparatus comprises a transmitter configured to transmit a search request for a surrounding user terminal, to a plurality of user terminals; a receiver configured to receive a search result for the surrounding user terminal based on the search request; and a controller configured to determine, on the basis of the search result, a scheduling terminal that performs an assignment of a radio resource used for the D2D communication, from among the plurality of user terminals. The transmitter transmits, to a user terminal determined as the scheduling terminal, a scheduling terminal request to request that the user terminal acts as the scheduling terminal.

DESCRIPTION OF EMBODIMENTS

[Overview of Embodiments]

Figure 1:
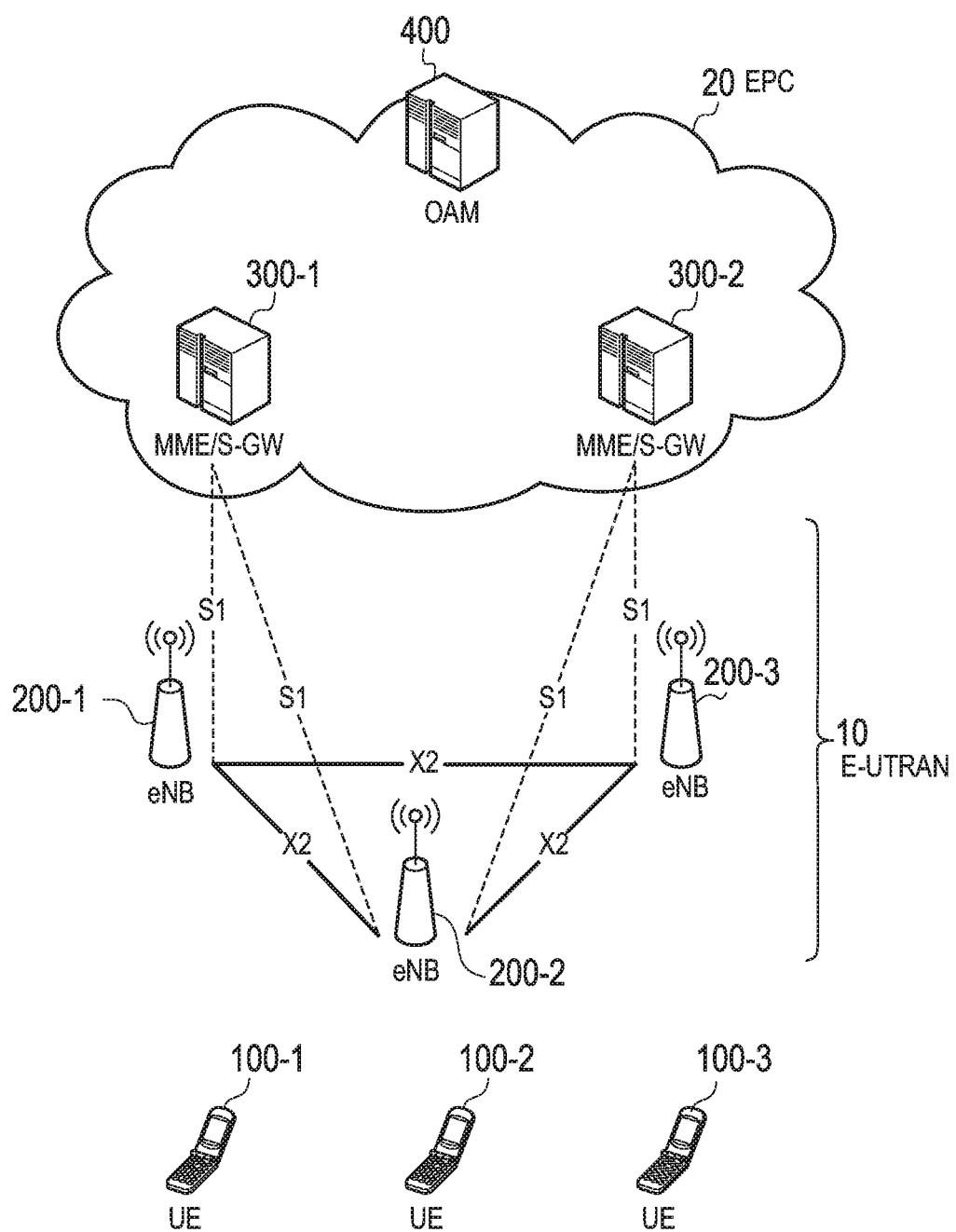
FIG. 1 is a configuration diagram of an LTE system.

A network apparatus according to embodiments is a network apparatus in a mobile communication system that supports D2D communication that is direct device-to-device communication. The network apparatus comprises a transmitter configured to transmit a search request for a surrounding user terminal, to a plurality of user terminals; a receiver configured to receive a search result for the surrounding user terminal based on the search request; and a controller configured to determine, on the basis of the search result, a scheduling terminal that performs an assignment of a radio resource used for the D2D communication, from among the plurality of user terminals. The transmitter transmits, to a user terminal determined as the scheduling terminal, a scheduling terminal request to request that the user terminal acts as the scheduling terminal.

In the network apparatus according to embodiments, the controller determines a user terminal to which the radio resource is assigned from the scheduling terminal, from among the plurality of user terminals. The transmitter transmits, together with the scheduling terminal request, identification information of another user terminal to which the radio resource is assigned, to the user terminal determined as the scheduling terminal.

In the network apparatus according to embodiments, the search request is a request to transmit a discovery signal used for discovering the user terminal. The receiver receives, as the search result, a reception result of the discovery signal and/or a reception result of a response to the discovery signal.

In the network apparatus according to embodiments, the controller determines, as the scheduling terminal, on the basis of the search result, a user terminal which discovers a relatively large number of user terminals, from among the plurality of user terminals.

In the network apparatus according to embodiments, the controller designates, when determining two or more user terminals as the scheduling terminal, each of radio resources assignable by the two or more user terminals so that each of the radio resources assigned by the two or more user terminals does not overlap.

In the embodiments, the two or more user terminals include a first user terminal and a second user terminal. The controller designates each of radio resources assignable by the first user terminal and the second user terminal so that each of the radio resources assigned by the first user terminal and the second user terminal does not overlap only when a first group to which the first user terminal and a user terminal assigned with the radio resource from the first user terminal belong and a second group to which the second user terminal and a user terminal assigned with the radio resource from the second user terminal belong are adjacent.

In the network apparatus according to embodiments, the transmitter transmits the search request when the receiver receives a relief notification based on the overlapping of the radio resources from at least one user terminal out of the plurality of user terminals.

In the embodiments, the relief notification indicates that the at least one user terminal detects interference from another D2D communication.

In the embodiments, the relief notification is transmitted when a first user terminal that performs the assignment of the radio resource changes, on the basis of assignment information of the radio resource of a second user terminal different from the first user terminal, assignment of the radio resource of the first user terminal.

A user terminal according to embodiments is a user terminal in a mobile communication system that supports D2D communication that is direct device-to-device communication. The user terminal comprises a receiver configured to receive, from a network apparatus, a search request for a surrounding user terminal; a controller configured to control, on the basis of the search request, to start searching the surrounding user terminal; and a transmitter configured to transmit a search result of the surrounding user terminal, to the network apparatus. The receiver receives a scheduling terminal request to request that the user terminal acts as the scheduling terminal when the user terminal is determined, on the basis of the search result, as a scheduling terminal that performs assignment of the radio resource used for the D2D communication.

In the user terminal according to embodiments, the receiver receives, together with the scheduling terminal request, identification information of another user terminal to which the radio resource is assigned by the user terminal.

In the embodiments, the search request is a request to transmit a discovery signal used for discovering the user terminal. The transmitter transmits, as the search result, a reception result of the discovery signal and/or a reception result of a response to the discovery signal, to the network apparatus.

In the user terminal according to embodiments, the transmitter transmits, to the network apparatus, a relief notification based on overlapping of the radio resources when a radio resource assigned for D2D communication of the user terminal and a radio resource used for another D2D communication overlap. The receiver receives the search request based on the relief notification.

In the user terminal according to embodiments, the transmitter transmits the relief notification to the network apparatus when the controller detects interference from the other D2D communication.

[Embodiments]

(LTE System)

FIG. 1 is a configuration diagram of an LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM (Operation and Maintenance) 400. Further, the EPC 200 corresponds to the core network.

The MME is a network node for performing various mobility controls, etc., for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
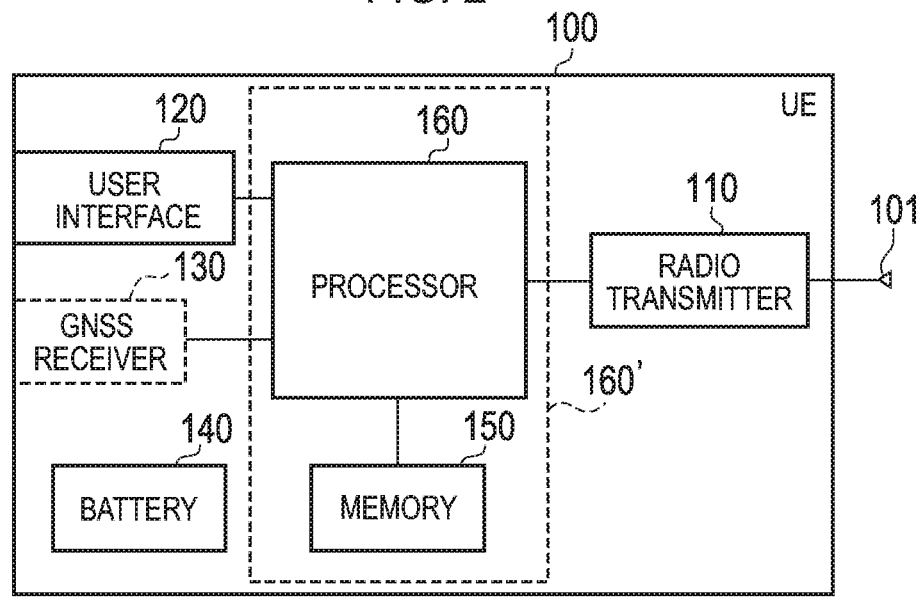
FIG. 2 is a block diagram of a UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
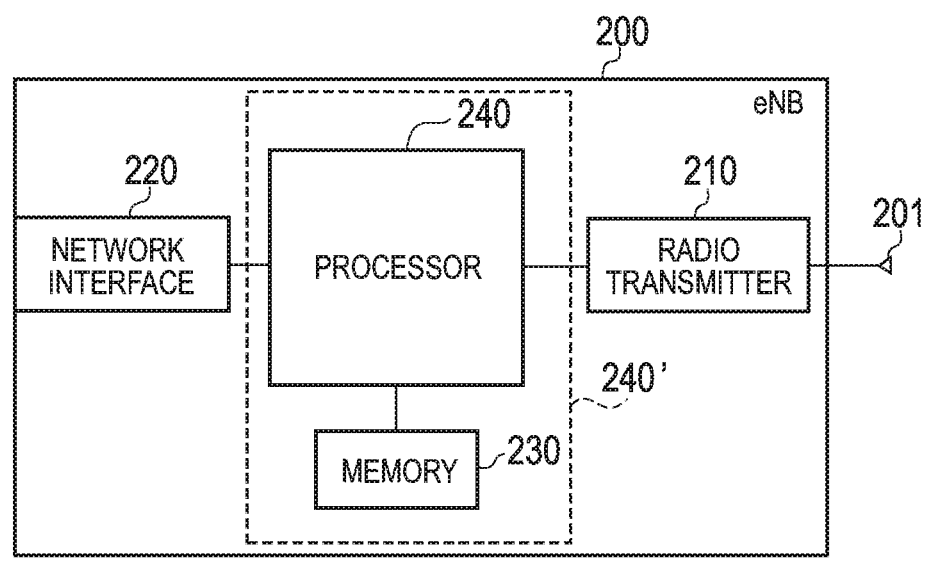
FIG. 3 is a block diagram of an eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. Furthermore, the memory 230 may be integrally formed with the processor 240, and this set (that is, a chipset) may be called a processor 240'.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that performs various processes by executing the program stored in the memory 230. The processor 240 implements various processes and various communication protocols described later.

Figure 4:
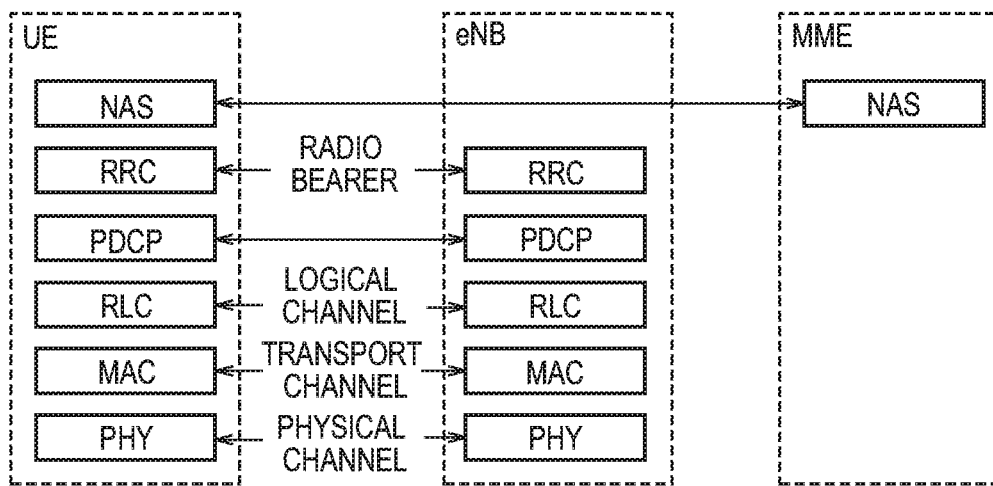
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes MAC scheduler that determines an uplink and downlink transport format (a transport block size, a modulation and coding scheme, and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management or mobility management, for example.

Figure 5:
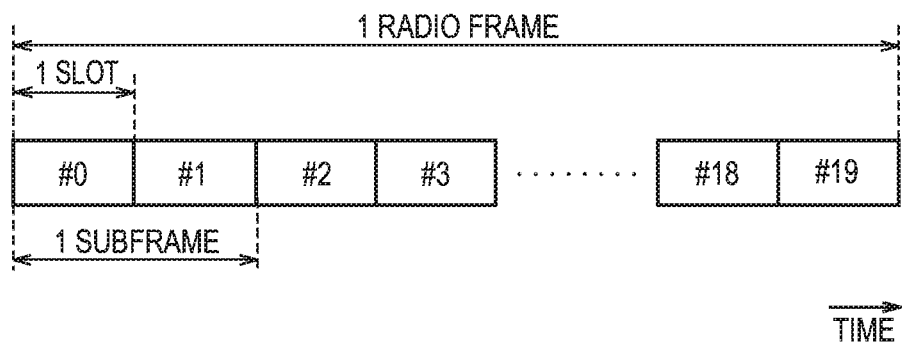
FIG. 5 is a configuration diagram of a radio frame used in an LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time-period direction. Each subframe has a length of 1 ms and each slot has a length of 0.5 ms. Each subframe includes a plurality of resource blocks (RBs) in a frequency direction, and a plurality of symbols in the time-period direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time-period resource can be designated by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, cell-specific reference signals (CRSS) are distributed and arranged.

In the uplink, both ends in the frequency direction of each subframe are control regions mainly used as a physical uplink control channel (PUCCH). Furthermore, the center portion in the frequency direction of each subframe is a region mainly used as a physical uplink shared channel (PUSCH). Moreover, in each subframe, a demodulation reference signal (DMRS) and a sounding reference signal (SRS) are arranged.

(D2D Communication)

Next, description will be provided by comparing the D2D communication with the normal communication (cellular communication) of the LTE system.

Figure 6:
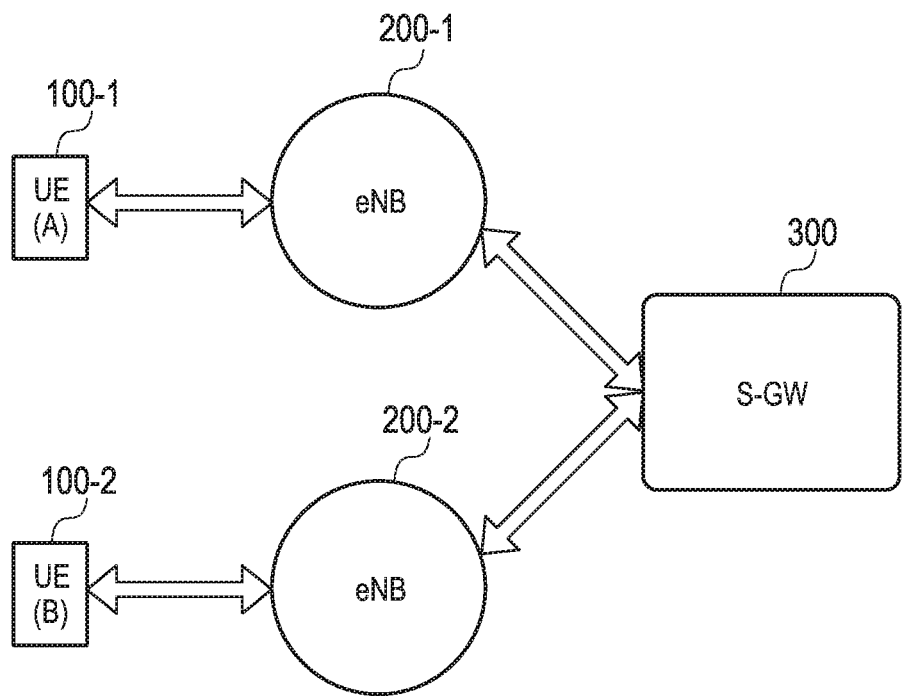
FIG. 6 is a diagram showing a data path in cellular communication.

FIG. 6 is a diagram showing a data path in the cellular communication. Here, a case is shown as an example in which the cellular communication is performed between UE 100-1 that establishes a connection with eNB 200-1 and UE 100-2 that establishes a connection with eNB 200-2. It is noted that the data path indicates a transfer path of user data (user plane).

As shown in FIG. 6, the data path of the cellular communication passes through the network. Specifically, the data path is set to pass through the eNB 200-1, the S-GW 300, and the eNB 200-2.

Figure 7:
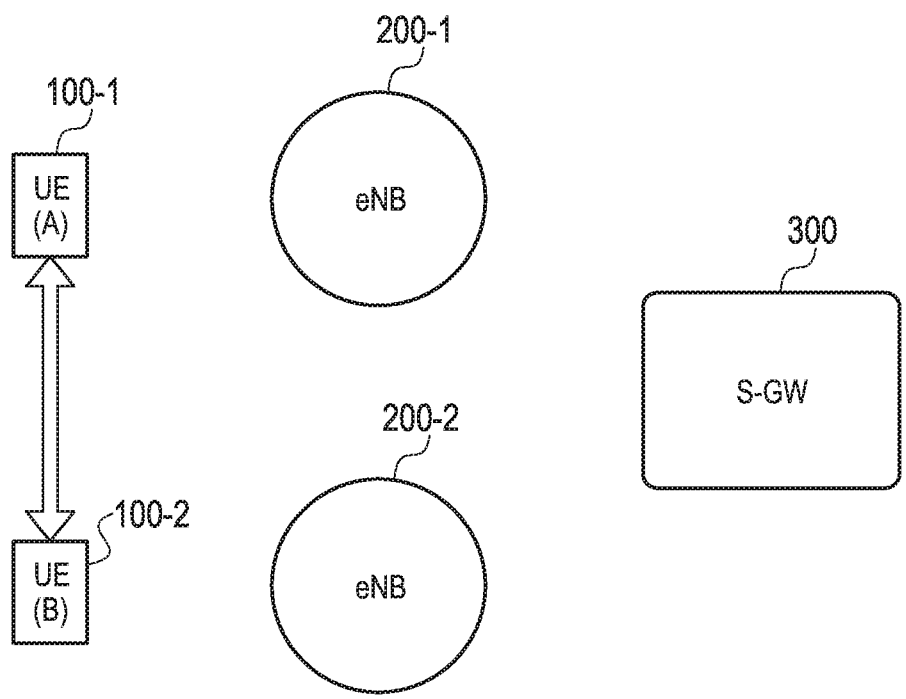
FIG. 7 is a diagram showing a data path in D2D communication.

FIG. 7 is a diagram showing a data path in the D2D communication. Here, a case is shown as an example in which the D2D communication is performed between the UE 100-1 that establishes a connection with the eNB 200-1 and the UE 100-2 that establishes a connection with the eNB 200-2.

For example, one UE 100 of the UE 100-1 and the UE 100-2 discovers the other UE 100 existing in the vicinity of the one UE 100, so that the D2D communication starts. It is noted that in order to start the D2D communication, the UE 100 has a (Discover) function of discovering the other UE 100 existing in the vicinity of the UE 100. Furthermore, the UE 100 has a (Discoverable) function of being discovered by the other UE 100.

As shown in FIG. 7, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load on the network and a battery consumption amount of the UE 100 are reduced, for example.

(Operation of Mobile Communication System)

(1) Operation Environment

Figure 8:
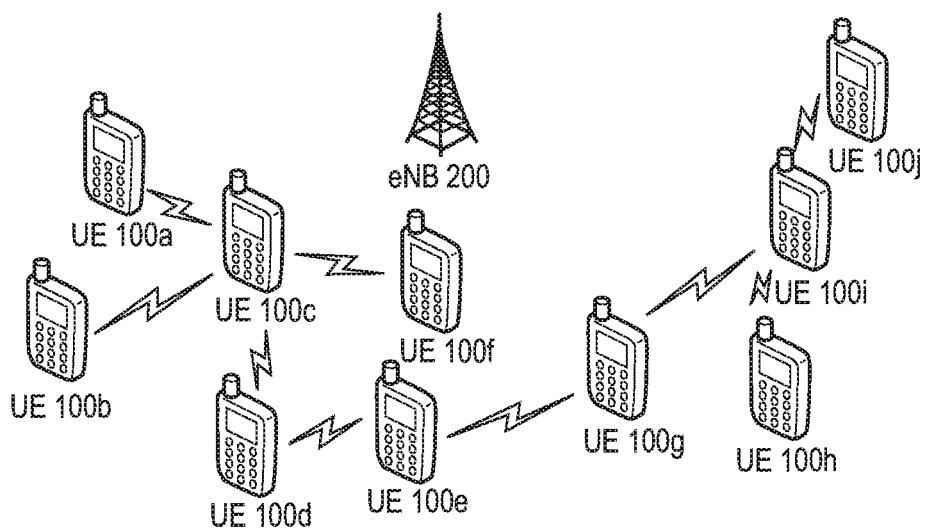
FIG. 8 is an explanatory diagram for describing an operation overview of the mobile communication system.

Next, by using FIG. 8, an operation environment of a mobile communication system according to the present embodiment will be described. FIG. 8 is an explanatory diagram for describing the operation environment of the mobile communication system.

As shown in FIG. 8, a UE 100*c* performs D2D communication with each of a UE 100*a*, a UE 100*b*, a UE 100*d*, and a UE 100*f*. Each of the UE 100*a*, the UE 100*b*, and the UE 100*f*, which is a scheduling UE that performs assignment of the radio resource used for the D2D communication, performs the scheduling for the D2D communication for itself, and transmits a scheduling result indicating the assigned radio resource, to the UE 100*c*. The UE 100*c* performs mediation on the assigned radio resources on the basis of the scheduling result received from each UE 100 so that the radio resources do not overlap each other. Specifically, when the radio resource assigned from a particular UE 100 (for example, the UE 100*a*) does not overlap the radio resource assigned from another UE 100, the UE 100*c* transmits, as a response to the scheduling result, an indication that the use of the radio resource is approved, to the UE 100*a* that assigns the radio resource. The UE 100*a* and the UE 100*c* use the radio resource to perform the D2D communication.

On the other hand, when the radio resource assigned from a particular UE 100 (for example, the UE 100*b*) overlaps the radio resource assigned from another UE 100 (for example, the UE 100*d*), the UE 100*c* transmits, as a response to the scheduling result, an indication that the use of the radio resource is refused, to the UE 100*b* that assigns the radio resource. When receiving the response to the scheduling result indicating that the use of the radio resource is refused, the UE 100*b* performs the scheduling again to change the assigned radio resource.

When the UE 100*b* performs the scheduling again so that the radio resource assigned from the UE 100*d* does not overlap the radio resource assigned from the other UE 100, the UE 100*c* transmits, as the response to the scheduling result, the indication that the use of the radio resource is approved, to the UE 100*d*.

It is noted that in addition to the above-mentioned method, the UE 100*c* may perform the mediation on the radio resource by another method.

Further, the UE 100*e* performs the D2D communication with each of the UE 100*d* and a UE 100*g*. Each of the UE 100*d* and the UE 100*g* performs the scheduling for the D2D communication, and transmits the respective scheduling results to the UE 100*e*. As described above, the UE 100*e* performs the mediation on the radio resource.

Further, a UE 100*i* performs the D2D communication with each of the UE 100*g*, a UE 100*h*, and a UE 100*j*. Each of the UE 100*g*, the UE 100*h*, and the UE 100*j* performs the scheduling for the D2D communication, and transmits the respective scheduling results to the UE 100*i*. As described above, the UE 100*i* performs the mediation on the radio resource.

It is noted that the number of scheduling UEs before transmitting a relief notification described later is seven (the UE 100*a*, the UE 100*b*, the UE 100*d*, the UE 100*f*, the UE 100*g*, the UE 100*h*, and the UE 100*j*).

(2) Operation Overview

Figure 9:
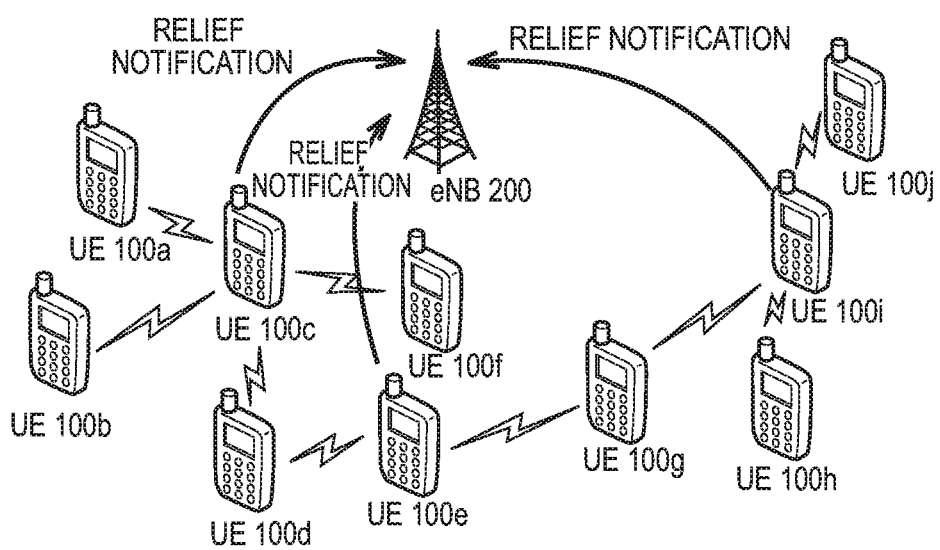
FIG. 9 is an explanatory diagram for describing the operation overview of the mobile communication system.
Figure 10:
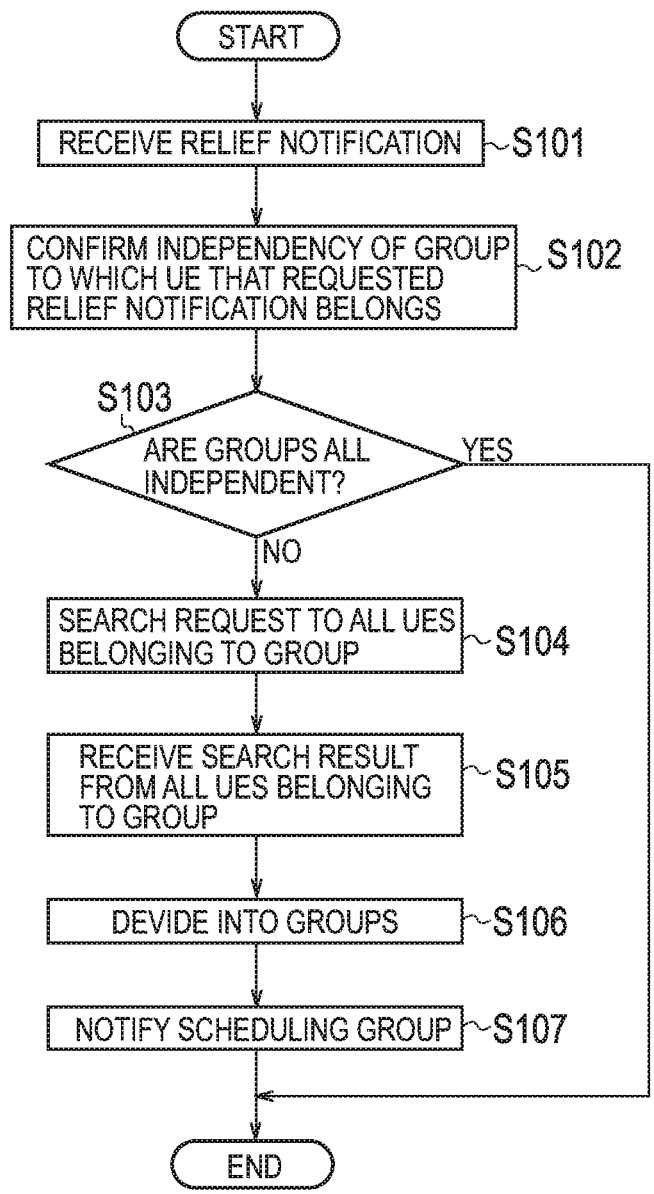
FIG. 10 is a flowchart showing an operation of an eNB 200 according to an embodiment.
Figure 11:
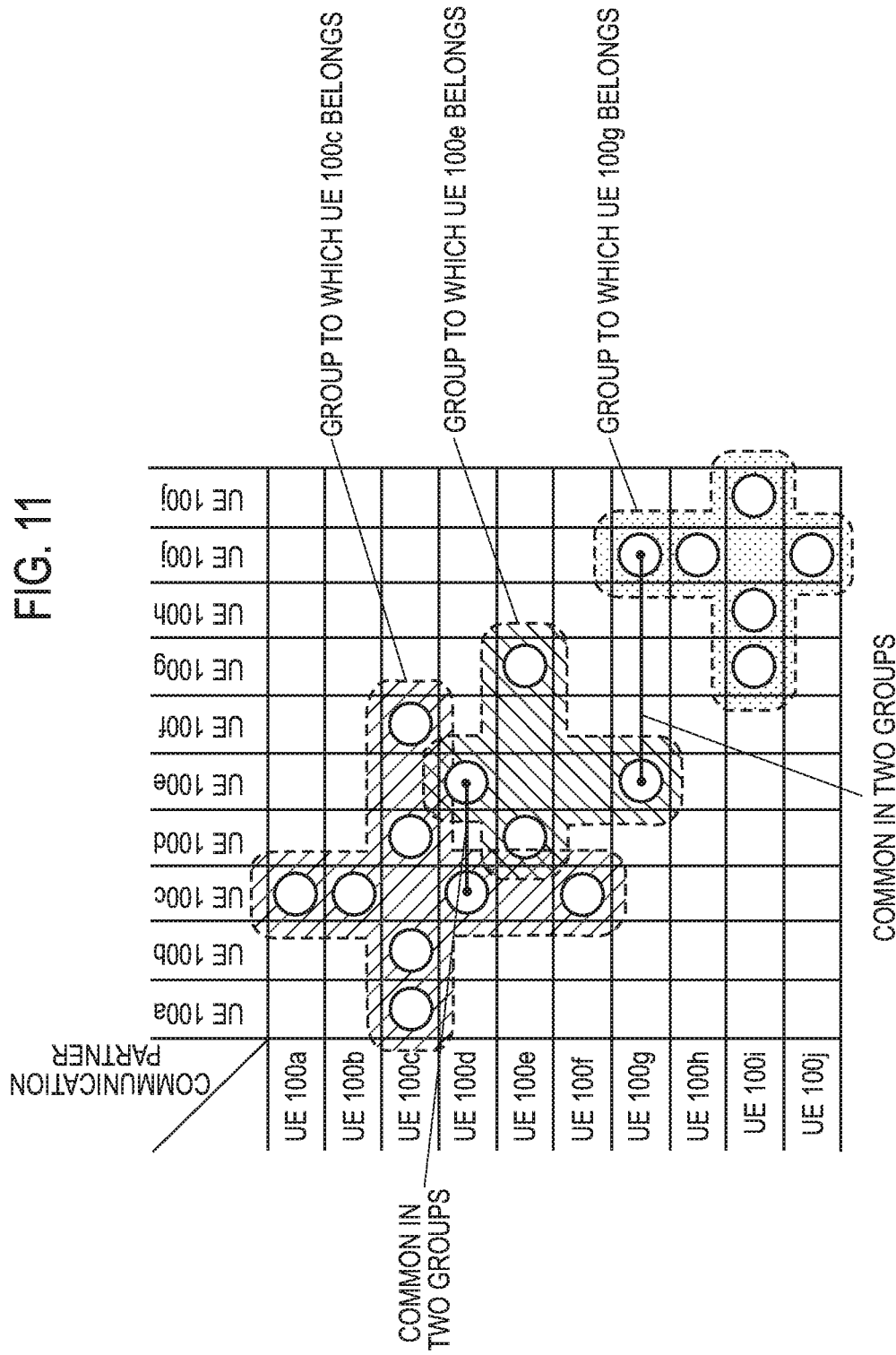
FIG. 11 is a diagram obtained by plotting communication partners with which each UE 100 according to the embodiment performs D2D communication.
Figure 12:
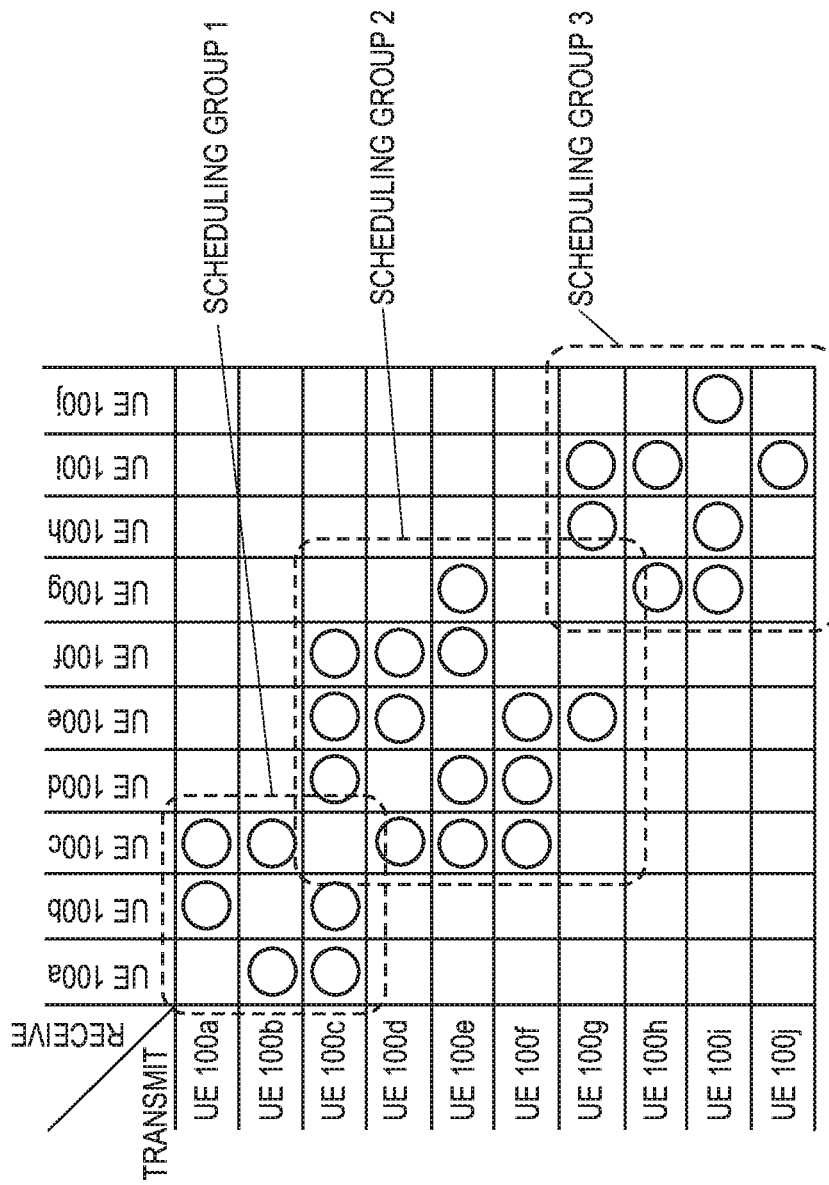
FIG. 12 is a diagram obtained by plotting the UEs 100 located around each UE 100 according to the embodiment.
Figure 13:
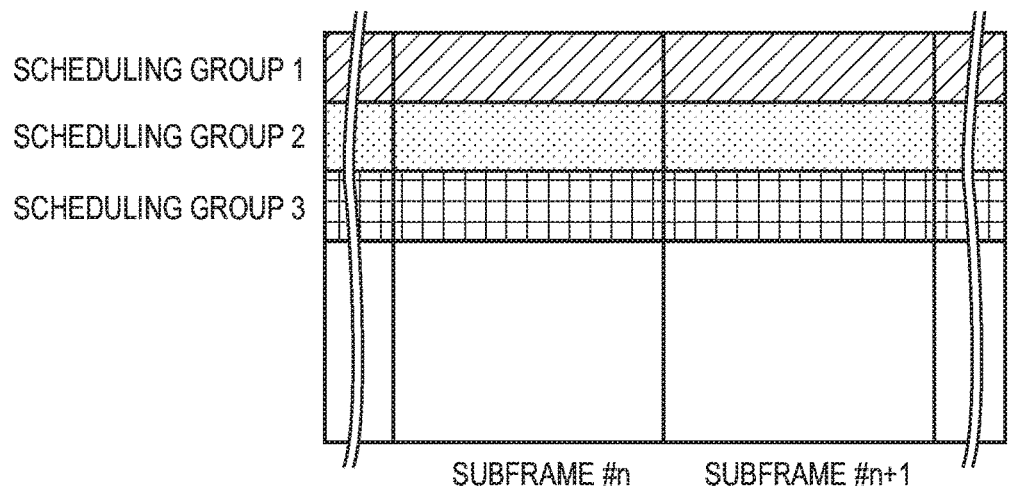
FIG. 13 is an explanatory diagram for describing one example of a radio resource designated by the eNB 200 according to the embodiment.
Figure 14:
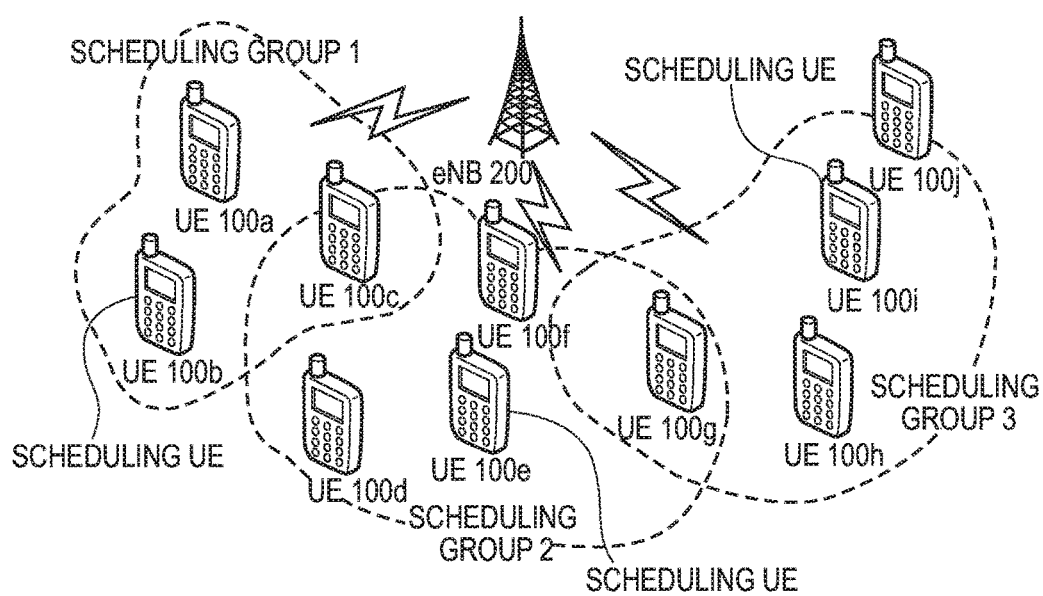
FIG. 14 is an explanatory diagram for describing an operation overview of the mobile communication system.

Next, by using FIG. 9 to FIG. 14, an operation overview of the mobile communication system according to the present embodiment will be described. FIG. 9 is an explanatory diagram for describing an operation overview of the mobile communication system. FIG. 10 is a flowchart showing an operation of the eNB 200 according to the embodiment. FIG. 11 is a diagram obtained by plotting communication partners with which each UE 100 according to the embodiment performs D2D communication. FIG. 12 is a diagram obtained by plotting the UEs 100 located around each UE 100 according to the embodiment. FIG. 13 is an explanatory diagram for describing one example of a radio resource designated by the eNB 200 according to the embodiment. FIG. 14 is an explanatory diagram for describing an operation overview of the mobile communication system.

As shown in FIG. 9, each of the UE 100c, the UE 100e, and the UE 100i transmits the relief notification based on the overlapping of the radio resources, to the eNB 200. The eNB 200 receives the relief notification (see step S101 in FIG. 10).

The relief notification is transmitted by the UE 100 on the basis of the overlapping of the radio resources. In the present embodiment, each of the UE 100c, the UE 100e, and the UE 100i transmits the relief notification when transmitting the scheduling result indicating that the use of the assigned radio resource is refused for a predetermined number of times or more by the overlapping of the radio resources, for example.

The relief notification includes an identifier of the UE 100 that transmits the relief notification (hereinafter, "relief UE 100"), and an identifier of the UE 100 that is a D2D communication partner of the relief UE 100 (hereinafter, "communication partner UE 100). Further, the relief notification may include at least one of: an identifier of the UE 100 that is a D2D communication partner of the communication partner UE 100, an identifier of the scheduling UE, and information indicating a scheduling capability of each of the relief UE 100 and the communication partner UE 100.

In the present embodiment, the UE 100c transmits the relief notification including, as the identifier of the communication partner UE 100, the identifier of each of the UE 100a, the UE 100b, the UE 100d, and the UE 100f, in addition to the identifier of itself (UE 100c). The UE 100e transmits the relief notification including, as the identifier of the communication partner UE 100, the identifier of each of the UE 100d and the UE 100g, in addition to the identifier of itself (UE 100e). The UE 100i transmits the relief notification including, as the identifier of the communication partner UE 100, the identifier of each of the UE 100g, the UE 100h, and the UE 100j, in addition to the identifier of itself (UE 100i).

The eNB 200 executes a process of step S102 in FIG. 10, in response to reception of the relief notification. It is noted that when receiving the relief notifications from a predetermined number of user terminals or more, the eNB 200 may execute the process of step S102.

As shown in FIG. 10, in step S 102, the eNB 200 confirms whether or not the groups to which the relief UE 100 belongs are present independently of each other. That is, the eNB 200 confirms whether or not the groups are present independently, on the basis of the identifier of the relief UE 100 and the identifier of the communication partner UE 100 included in the relief notification received from each UE 100 (the UE 100c, the UE 100e, and the UE 100i).

In step S103, when determining that the groups to which the relief UE 100 belongs are present independently of each other (when "Yes" in step S103), the eNB 200 ends the operation. On the other hand, when determining that the groups are not present independently of each other, that is, when determining that a plurality of groups are present in an overlapping manner (when "No" in step S103), the eNB 200 executes the process of step S104.

As shown in FIG. 11, the eNB 200 is capable of grasping a distribution state of the groups to which the relief UE 100 belongs, on the basis of the relief notification.

From the relief notification received from each of the UE 100c and the UE 100e, the UE 100d is common and from the relief notification received from each of the UE 100e and the UE 100i, the UE 100g is common, and thus, as shown in FIG. 11, the eNB 200 determines that the group to which the UE 100c belongs and the group to which the UE 100e belongs are present in an overlapping manner and the group to which the UE 100e belongs and the group to which the UE 100i belongs are present in an overlapping manner. Therefore, in the present embodiment, the process of step S104 is executed.

Returning to FIG. 10, in step S104, the eNB 200 transmits a search request for a surrounding UE 100, to all the UEs 100 belonging to the group. The UE 100 receives the search request. In the present embodiment, the eNB 200 requests, as the search request, a transmission of a discovery signal used for discovering the UE 100 (hereinafter, "Discovery signal").

It is noted that the eNB 200 may transmit, together with the search request, a timing at which to exchange assignment information of a radio resource for transmitting the Discovery signal and/or the Discovery signal. Further, the eNB 200 may not directly transmit the search request but may transmit the search request via the relief UE 100, to each of all the UEs 100 belonging to the group. The search request may be transmitted via an anchor UE that representatively performs the communication with the eNB 200.

The UE 100 starts searcing the surrounding UEs 100, on the basis of the search request. Specifically, the UE 100 performs transmission of the Discovery signal and reception of the Discovery signal from another UE 100. Further, the UE 100 may perform transmission of a Discovery response that is a response to the Discovery signal or reception of the Discovery response from another UE 100.

As a search result, the UE 100 transmits a reception result of the Discovery signal and/or a reception result of the Discovery response, to the eNB 200. In step S105, the eNB 200 receives, as the search result, the reception result. It is noted that the UE 100 may transmit the reception result to the eNB 200 via the relief UE 100 or the anchor UE.

In step S106, the eNB 200 performs grouping on the basis of the search result so that the number of scheduling UEs decreases. Specifically, the eNB 200 determines, from a plurality of UEs 100 subject to the grouping, a scheduling UE that performs assignment of the radio resource used for the D2D communication and a non-scheduling UE to which the radio resource is assigned from the scheduling UE. As a result, a scheduling group including the scheduling UE and the non-scheduling UE is determined.

Firstly, as shown in FIG. 12, the eNB 200 grasps the UE 100 located around each UE 100, on the basis of the reception result of the Discovery signal of each UE 100 and/or the reception result of the Discovery response.

Next, the eNB 200 determines the scheduling UE and the non-scheduling UE so that the number of scheduling UEs decreases.

The eNB 200 determines, as the scheduling UE, a UE 100 which discovers a relatively large number of UEs 100. Further, the eNB 200 determines the scheduling UE and the non-scheduling UE so that the radio resource is assigned to all the UEs 100.

Further, when receiving at least one of the identifier of the UE 100 that is a D2D communication partner of the communication partner UE 100, the identifier of the scheduling UE, and the information indicating a scheduling capability, the eNB 200 comprehensively takes these into consideration to determine the scheduling UE and the non-scheduling UE. For example, the eNB 200 excludes, on the basis of the identifier of the scheduling UE and/or the information indicating the scheduling capability, the UE 100 not having the scheduling capability from a candidate scheduling UE. That is, the eNB 200 determines, as the non-scheduling UE, the UE 100 not having the scheduling capability. Further, the eNB 200 determines the scheduling UE from among the UEs 100 that are the candidate scheduling UEs.

In the present embodiment, the eNB 200 determines the UE 100*b*, the UE 100*e*, and the UE 100*i*, as the scheduling UE. Further, the eNB 200 determines the UE 100*a* and the UE 100*c* as the non-scheduling UE belonging to a scheduling group 1 of the UE 100*b*, determines the UE 100*c*, the UE 100*d*, the UE 100*f*, and the UE 100*g* as the non-scheduling UE belonging to a scheduling group 2 of the UE 100*e*, and determines the UE 100*g*, the UE 100*h*, and the UE 100*j* as the non-scheduling UE belonging to a scheduling group 3 of the UE 100*i*. As a result, the number of scheduling UEs decreases from seven to three.

Next, the eNB 200 designates respective radio resources assignable by the UE 100*b*, the UE 100*e*, and the UE 100*i* so that the respective radio resources assigned by the UE 100*b*, the UE 100*e*, and the UE 100*i* that are the scheduling UEs do not overlap each other.

As shown in FIG. 13, the eNB 200 designates the radio resource (band assignment) so that the respective scheduling groups do not overlap each other. Further, only when the eNB 200 is adjacent to the scheduling groups, the eNB 200 may designate so that the band assignments designated used between the adjacent scheduling groups are not adjacent. Therefore, in the present embodiment, in FIG. 13, the radio resource may be designated so that the band assignments of the scheduling groups 1 and 3 are assignable commonly by the scheduling groups 1 and 3.

It is noted that when the UEs 100 belonging to the scheduling group are in common, the eNB 200 may determine that the scheduling groups are adjacent to each other, and when the UE 100 belonging to the scheduling group already discovers the UE 100 belonging to another scheduling group, the eNB 200 may determine that the scheduling groups are adjacent to each other.

Returning to FIG. 10, in step S107, the eNB 200 notifies each UE 100 of the determined scheduling group.

Specifically, the eNB 200 transmits a scheduling UE request to request that each of the UE 100*b*, the UE 100*e*, and the UE 100*i* that are the determined scheduling UE becomes the scheduling UE. Each of the UE 100*b*, the UE 100*e*, and the UE 100*i* receives the scheduling UE request. Further, the eNB 200 may transmit, together with the scheduling UE request, an identifier of another UE 100 which is assigned with a radio resource by each scheduling UE. Specifically, in the present embodiment, the eNB 200 may transmit the identifier of the UE 100*a* and the UE 100*c*, to the UE 100*b*, transmit the identifier of the UE 100*c*, the UE 100*d*, the UE 100*f*, and the UE 100*g*, to the UE 100*e*, and transmit the identifier of the UE 100*g*, the UE 100*h*, and the UE 100*j*, to the UE 100*i*.

Further, as shown in FIG. 14, in order to announce, to each UE 100 that is the determined non-scheduling, the scheduling UE that assigns the radio resource to each UE 100, the eNB 200 may transmit by unicast the identifier of the scheduling UE 100 or may broadcast a list regarding a UE 100 belonging to each scheduling group and a scheduling UE (and a non-scheduling UE). Further, each scheduling UE may directly announce to a UE 100 belonging to the same scheduling group that each scheduling UE is the scheduling UE.

It is noted that the eNB 200 may not directly transmit, to each of the respective UEs 100, the scheduling UE request and the identifier of the scheduling UE for announcing the scheduling UE to the non-scheduling UE but transmit the same via a relief UE 100 or an anchor UE.

Each UE 100 that receives the scheduling UE request starts the scheduling. Specifically, the scheduling UE assigns the radio resource to each UE 100 of the scheduling group to which the scheduling UE itself belongs. Each UE 100 performs the D2D communication by using the assigned radio resource.

(Modification of Embodiment)

Figure 15:
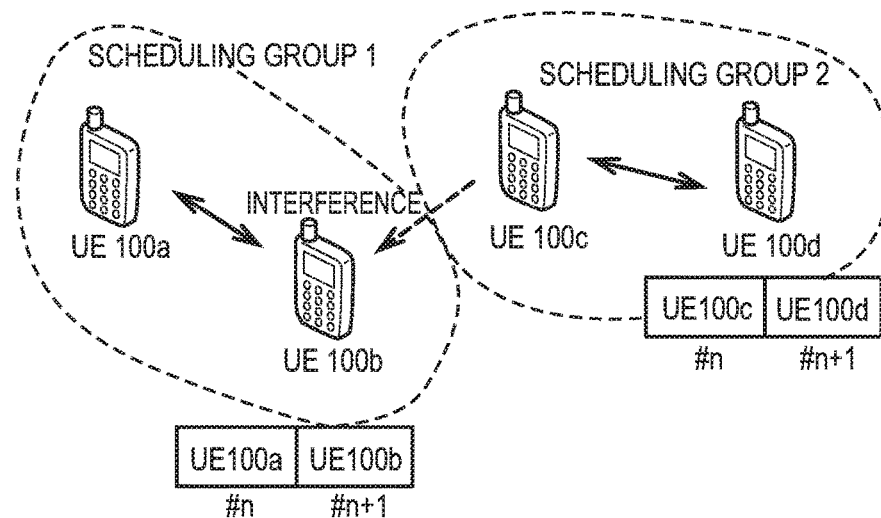
FIG. 15 is an explanatory diagram for describing a case where the UE 100 transmits a relief notification, in an operation environment according to a first modification of the embodiment.
Figure 16:
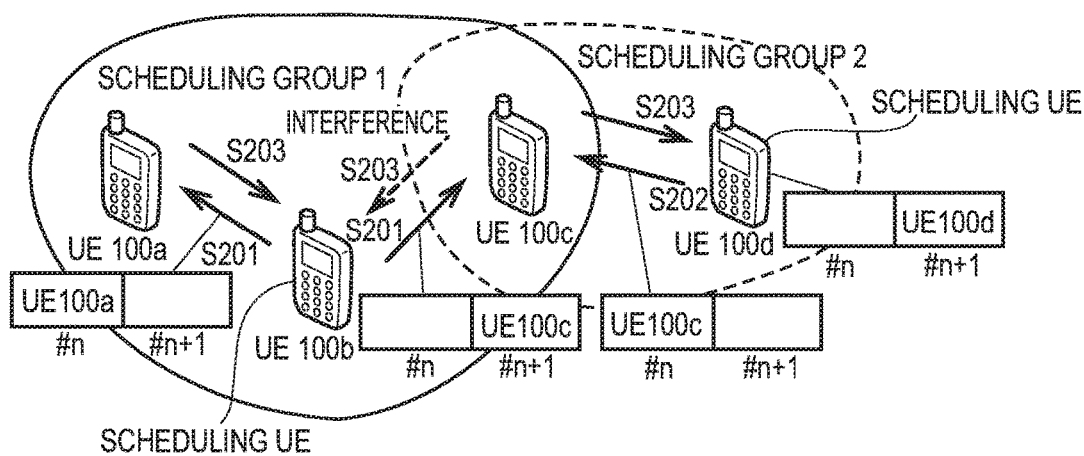
FIG. 16 is an explanatory diagram for describing a case where the UE 100 transmits a relief notification, in an operation environment according to a second modification of the embodiment.
Figure 17:
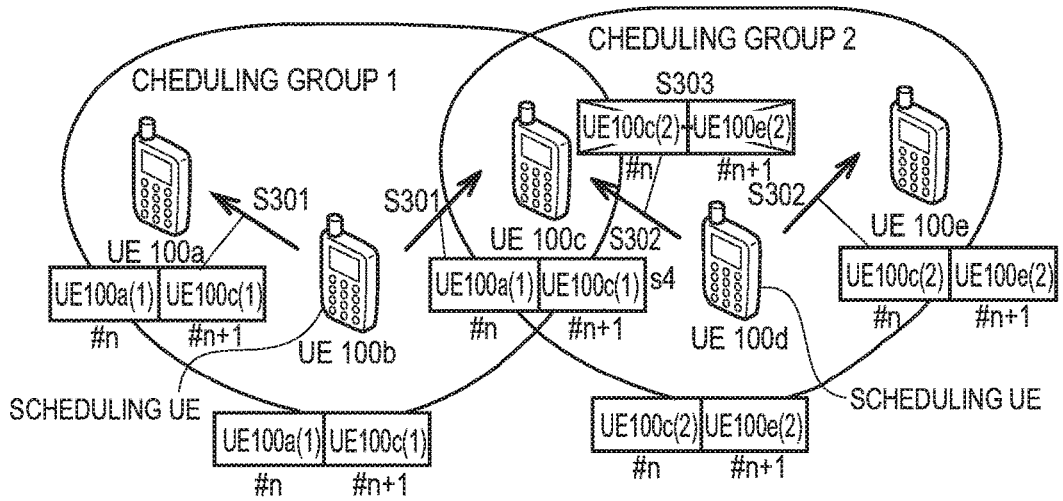
FIG. 17 is an explanatory diagram for describing a case where the UE 100 transmits a relief notification, in an operation environment according to a third modification of the embodiment.
Figure 18:
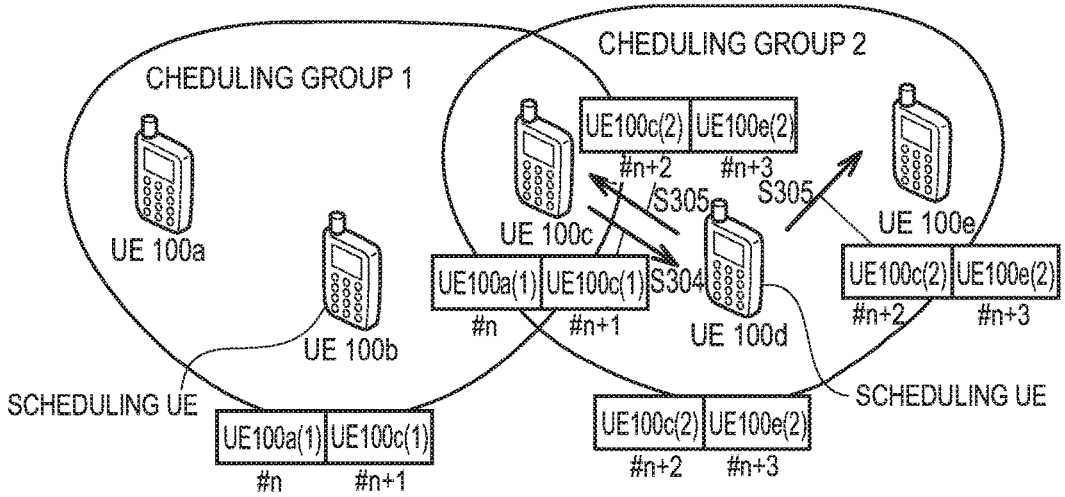
FIG. 18 is an explanatory diagram for describing the case where the UE 100 transmits the relief notification, in the operation environment according to the third modification of the embodiment.

Next, a modification of the embodiment will be described with reference to FIG. 15 to FIG. 18. FIG. 15 is an explanatory diagram for describing a case where the UE 100 transmits the relief notification, in an operation environment according to a first modification of the present embodiment. FIG. 16 is an explanatory diagram for describing a case where the UE 100 transmits the relief notification, in an operation environment according to a second modification of the present embodiment. FIG. 17 and FIG. 18 are explanatory diagrams for describing a case where the UE 100 transmits the relief notification, in an operation environment according to a third modification of the present embodiment.

Description will be provided while focusing on a portion different from the above-described embodiment and each modification, and description of a similar portion will be omitted, where necessary.

(1) First Modification

In the above-described embodiment, the UE 100 that performs the mediation on the radio resource transmits the relief notification. In the present modification, the UE 100 that detects interference from another D2D communication transmits the relief notification.

Firstly, as shown in FIG. 15, the UE 100*a* and the UE 100*b* belonging to the scheduling group 1 perform the D2D communication, and the UE 100*c* and the UE 100*d* belonging to the scheduling group 2 perform the D2D communication. Further, the scheduling group 1 and the D2D communication group 2 are adjacent. Specifically, the UE 100*b* is located near the UE 100*c*. Further, each UE 100 performs the D2D communication by using the same frequency band.

In such a situation, it is assumed that, in the scheduling group 1, the radio resource of an nth subframe is assigned to the UE 100*a* and the radio resource of an (n+1)th subframe is assigned to the UE 100*b*, and in the scheduling group 2, the radio resource of an nth subframe is assigned to the UE 100*c* and the radio resource of an (n+1)th subframe is assigned to the UE 100*d*.

In this case, the radio resource of the nth subframe is shared by the UE 100*a* and the UE 100*c*, and thus, when the UE 100*a* uses the radio resource of the nth subframe to transmit the data to the UE 100*b*, the UE 100*c* uses, at the same time, the radio resource of the nth subframe to transmit the data to the UE 100*d*. As a result, the transmission signal from the UE 100*c* acts as the interference signal, and the UE 100*b* is thus not capable of receiving the data from the UE 100*a*. In this case, determining that the interference from another D2D communication is detected, the UE 100*b* transmits, as the relief notification, a notification indicating that the interference is detected, to the eNB 200. When detecting the relief notification for a predetermined number of times or more, the UE 100*b* may transmit the relief notification to the eNB 200.

When receiving the relief notification, the eNB 200 transmits the search request to each UE 100 that performs the D2D communication. The eNB 200 may transmit, on the basis of the location information of the UE 100, the search request to UEs 100 located around the UE 100b.

(2) Second Modification

Next, in the above-described first modification, the UE 100 that detects the interference from the UE 100 belonging to another scheduling group, transmits the relief notification. In the present modification, the UE 100 that detects the interference from the UE 100 belonging to a plurality of scheduling groups, transmits the relief notification.

Firstly, as shown in FIG. 16, the UE 100b belonging to the scheduling group 1 is the scheduling UE, and the UE 100a and the UE 100c are the non-scheduling UE. Further, the UE 100d belonging to the scheduling group 2 is the scheduling UE, and the UE 100e is the non-scheduling UE. Further, each UE 100 performs the D2D communication by using the same frequency band.

As shown in FIG. 16, in step S201, the UE 100b that is the scheduling UE transmits the assignment information of the radio resource, to each of the UE 100a and the UE 100c belonging to the scheduling group 1. Each of the UE 100a and the UE 100c receives the assignment information. The UE 100b transmits to the UE 100a the assignment information indicating the radio resource of the nth subframe, and transmits to the UE 100c the assignment information indicating the radio resource of the (n+1)th subframe.

In step S202, similarly to step S201, the UE 100d that is the scheduling UE transmits the assignment information of the radio resource, to the UE 100c belonging to the scheduling group 2. The UE 100c receives the assignment information. The UE 100d transmits to the UE 100c the assignment information indicating the radio resource of the nth subframe.

The radio resource assigned from the UE 100b and the radio resource assigned from the UE 100d do not overlap, and thus, the UE 100c determines to perform the D2D communication by using these radio resources.

In step S203, the UE 100a uses the radio resource of the nth subframe to transmit the data to the UE 100b, and at the same time, the UE 100c uses the radio resource of the nth subframe to transmit the data to the UE 100d. As a result, the transmission signal from the UE 100c acts as the interference signal, and the UE 100b is thus not capable of receiving the data from the UE 100a. In this case, similarly to the above-described first modification, determining that the interference from another D2D communication is detected, the UE 100b transmits, as the relief notification, a notification indicating that the interference is detected, to the eNB 200.

(3) Third Modification

Next, in the above-described first and second modifications, when the interference is detected, the relief notification is transmitted. In the present modification, the radio resource is mediated between a plurality of UEs 100.

Firstly, as shown in FIG. 17, the UE 100b belonging to the scheduling group 1 is the scheduling UE, and the UE 100a and the UE 100c are the non-scheduling UE. Further, the UE 100d belonging to the scheduling group 2 is the scheduling UE, and the UE 100c and the UE 100e are the non-scheduling UE. Further, each UE 100 performs the D2D communication by using the same frequency band.

As shown in FIG. 17, in step S301, the UE 100b that is the scheduling UE transmits the assignment information of the radio resource, to each of the UE 100a and the UE 100c belonging to the scheduling group 1. Each of the UE 100a and the UE 100c receives the assignment information. In the present modification, different from the above-mentioned first modification, the assignment information includes information on the radio resource assigned to another UE 100 belonging to the scheduling group 1. Therefore, the UE 100b transmits, to each of the UE 100a and the UE 100c, the assignment information indicating the radio resource of the nth subframe assigned to the UE 100a and the radio resource of the (n+1)th subframe assigned to the UE 100c.

In step S302, the UE 100d that is the scheduling UE transmits the assignment information of the radio resource, to each of the UE 100c and the UE 100e belonging to the scheduling group 2. Each of the UE 100c and the UE 100d receives the assignment information. Similarly to step S301, the UE 100d transmits, to each of the UE 100c and the UE 100e, the assignment information indicating the radio resource of the nth subframe assigned to the UE 100c and the radio resource of the (n+1) th subframe assigned to the UE 100e.

In step S303, the UE 100c performs mediation on the radio resource, on the basis of the assignment information from each of the UE 100b and the UE 100d. The radio resource of the nth subframe in the scheduling group 1 is assigned to the UE 100a, and thus, when the UE 100c transmits the data to the UE 100d by using the radio resource of the nth subframe, the UE 100c determines that the interference is applied to the UE 100b. Therefore, the UE 100c determines to not approve the use of the radio resource assigned from the UE 100d.

As shown in FIG. 18, in step S304, the UE 100c transmits, together with information with an indication that the use of the radio resource assigned from the UE 100d is not approved, the assignment information in the scheduling group 1, to the UE 100d.

The UE 100d determines to change the radio resource assigned to the UE 100c, on the basis of the information with an indication that the use of the radio resource from the UE 100c is not approved. Further, the UE 100d determines, on the basis of the assignment information in the scheduling group 1, that the radio resource assigned to the UE 100e (subframe #n+1) overlaps the radio resource assigned to the UE 100c in the scheduling group 2 (subframe #n+1). As a result, the UE 100d determines to change the radio resource assigned to the UE 100e. The UE 100d transmits information for cancelling the assignment of the radio resource, to the UE 100e that does not receive the information with an indication that the use of the radio resource is not approved.

In step S305, the UE 100d changes the assignment of the radio resource and transmits the assignment information of a new radio resource to the UE 100c and the UE 100e. The UE 100c and the UE 100d receive the new radio resource information.

The UE 100d changes the assignment of the radio resource, on the basis of the assignment information in the scheduling group 1 received in step S304. For example, when assigning, to the UE 100c the radio resource of the (n+1)th subframe rather than the nth subframe, the UE 100d determines the overlapping with the radio resource of the (n+1)th subframe assigned to the UE 100c in the scheduling group 1. Therefore, the UE 100d assigns the radio resource of an (n+2)th subframe to the UE 100c, and assigns the radio resource of an (n+3)th subframe to the UE 100e. The UE 100d transmits the assignment information indicating the radio resource assigned to each of the UE 100c and the UE 100e, to each of the 100c and the UE 100e. Here, when changing the assignment of the radio resource in the scheduling group 2, similarly to the first embodiment, on the basis of the assignment information of the UE 100c (assignment information in the scheduling group 1), the UE 100d (scheduling UE) that performs the assignment of the radio resource may transmit the relief notification to the eNB 200. Further, when the number of times of changes of radio resource assignment exceeds a predetermined number of times, the UE 100*d* may transmit the relief notification to the eNB 200.

(Summary of Embodiment)

In the present embodiment, the eNB 200 (radio transceiver 210) transmits the search request for the surrounding UEs 100, to the plurality of UEs 100. The eNB 200 (radio transceiver 210) receives the search result for the surrounding UEs 100 based on the search request. The eNB 200 (controller) determines, on the basis of the search result, the scheduling UE from among the plurality of UEs 100. The eNB 200 (radio transceiver 210) transmits the scheduling UE request to the UE 100 that is determined to be the scheduling UE. The UE 100 (radio transceiver 110) receives the search request from the eNB 200. The UE 100 (controller) controls to start searcing the surrounding UEs 100, on the basis of the search request. The UE 100 (radio transceiver 110) transmits the search result of the surrounding UEs 100, to the eNB 200. The UE 100 (radio transceiver 110) receives the scheduling UE request. As a result, the eNB 200 receives the search result of the surrounding UEs 100 to grasp a distribution state of the UEs 100. Thus, in accordance with the distribution state of the UE 100, it is possible to determine the scheduling UE, and thus, it is possible to reduce the number of scheduling UEs.

Further, the eNB 200 (controller) determines the non-scheduling UE from among the plurality of UEs. The eNB 200 (radio transceiver 210) transmits, together with the scheduling UE request, identification information of another UE 100 which is assigned with the radio resource by the UE 100 that is determined to be the scheduling UE. Further, the UE 100 (radio transceiver 110) receives, together with the scheduling UE request, identification information of another UE 100 which is assigned with the radio resource by the UE 100. Thus, the scheduling UE is capable of grasping the UE 100 to be scheduled by the scheduling UE itself, and thus, it is possible to effectively perform the assignment of the radio resource.

Further, the search request is a request for transmission of the Discovery signal. The eNB 200 (radio transceiver 210) receives, as the search result, a reception result of the Discovery signal and/or a reception result of the Discovery response. Further, the UE 100 (radio transceiver 110) transmits, as the search result, a reception result of the Discovery signal and/or a reception result of the Discovery response, to the eNB 200. As a result, even though a new signal for searching the surrounding UEs 100 is not defined, the UE 100 is capable of searching the surrounding UEs 100.

Further, the eNB 200 (controller) determines, as the scheduling UE, on the basis of the search result, a UE 100 which discovers a relatively large number of UEs 100, from among the plurality of UEs 100. This increases the number of UEs 100 to which one scheduling UE assigns the radio resource, and thus, it is possible to further reduce the number of scheduling UEs.

Further, when determining two or more UEs 100 as the scheduling UE, the eNB 200 (controller) designates each of the radio resources assignable by the two or more UEs 100 so that each of the radio resources assigned by the two or more UEs 100 does not overlap. As a result, among each of the scheduling groups, the radio resources do not overlap, and thus, it is possible to restrain the interference from occurring.

It is noted that when the number of scheduling UEs is decreased, the eNB 200 is capable of designating a large radio resource region as an assignable radio resource, as compared to a case where the number of scheduling UEs is not decreased.

Further, only when the scheduling groups are adjacent, the eNB 200 (controller) designates each of the radio resources assignable by each scheduling UE belonging to each of the adjacent scheduling groups so that the radio resources assigned between the adjacent scheduling groups do not overlap. As a result, between the nonadjacent scheduling groups, even when the assigned radio resources overlap, a possibility that the interference occurs is low, and thus, the eNB 200 is capable of designating the common radio resources. Therefore, the eNB 200 is capable of designating a larger radio resource region as an assignable radio resource in the nonadjacent scheduling groups.

Further, when receiving, from the UE 100, the relief notification based on the overlapping of the radio resources, the eNB 200 (radio transceiver 210) transmits the search request. Further, when the radio resource assigned for the D2D communication of the UE 100 and the radio resource used for another D2D communication overlap, the UE 100 (radio transceiver 110) transmits the relief notification to the eNB 200. The UE 100 (radio transceiver 110) receives the search request based on the relief notification. As a result, when the radio resources do not overlap and thus good D2D communication is performed, the eNB 200 is capable of restraining the transmission of the search request.

Further, when the UE 100 (controller) detects the interference from another D2D communication, the UE 100 (radio transceiver 110) transmits the relief notification to the eNB 200. Further, the relief notification indicates that the UE 100 detects the interference from another D2D communication. As a result, when the interference occurs, the relief notification is transmitted, and thus, it is possible to restrain the eNB 200 from wastefully determining the scheduling UE before the interference occurs.

Further, the relief notification is transmitted when the scheduling UE changes, on the basis of the assignment information of the radio resource of another scheduling UE, the assignment of the radio resource. Further, the UE 100 (radio transceiver 110) receives the assignment information on the radio resource used for another D2D communication. The UE 100 (radio transceiver 110) transmits, to the eNB 200, the relief notification when the UE 100 (controller) changes the assignment of the radio resource on the basis of the assignment information. As a result, when the scheduling of the UE 100 is not efficient, the relief notification is transmitted, and thus, when the scheduling of the UE 100 is efficient, it is possible to refrain the eNB 200 from wastefully determining the scheduling UE.

[Other Embodiments]

As described above, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

For example, instead of the eNB 200 in the above-described embodiment, another network apparatus may determine the scheduling UE, for example. For example, an upper device (for example, MME) of the eNB 200 or a server device for determining the scheduling UE may determine the scheduling UE.

Further, in the above-described embodiment, the eNB 200 uses the relief notification as a trigger to transmit the search request; however, this is not limiting. In a case where the eNB 200 such as the eNB 200 takes the initiative to perform the assignment of the radio resource, the eNB 200 may transmit the search request when changing a mode so that the UE 100 takes the initiative to perform the assignment of the radio resource. The eNB 200 may change a mode so that the UE 100 takes the initiative to perform the assignment of the radio resource, after the scheduling UE that is determined by the eNB 200 starts the assignment of the radio resource.

Further, in the above-described embodiment, each UE 100 that receives the scheduling UE request may transmit, to the eNB 200, an acknowledgment or a negative acknowledgment to the scheduling UE request. The UE 100 transmits the acknowledgment to the eNB 200 when consenting to act as the scheduling UE, and the UE 100 transmits the negative acknowledgment to the eNB 200 when refusing to act as the scheduling UE. For example, the UE 100 not having a scheduling capability transmits the negative acknowledgment to the eNB 200 when receiving the scheduling UE request. The eNB 200 that receives the negative acknowledgment newly determines the scheduling UE (see step S106). It is noted that the eNB 200 may perform a process of step S107 excluding the transmission of the scheduling UE request, after receiving the acknowledgment from all the UEs 100 that transmit the scheduling UE request.

Further, in the above-described embodiment, the eNB 200 determines the plurality of scheduling UEs; however, the eNB 200 may determine only one UE 100 as the scheduling UE.

It is noted that the aforementioned embodiment has described an example in which the present invention is applied to the LTE system. However, the present invention is not limited to the LTE system, and may also be applied to systems other than the LTE system.

In addition, the entire content of Japanese Patent Application No. 2013-174322 (filed on Aug. 26, 2013) is incorporated in the present specification by reference.
25

INDUSTRIAL APPLICABILITY

According to the invention-based network apparatus and user terminal, when a user terminal takes the initiative to perform an assignment of the radio resource used for D2D communication, it is possible to reduce the number of scheduling terminals and perform good D2D communication.

The invention claimed is:

1. A base station in a mobile communication system that supports D2D communication that is direct device-to-device communication, comprising:
a transmitter, a receiver and a controller, wherein
the receiver receives a relief notification from at least one user terminal out of a plurality of user terminals, wherein the relief notification is transmitted by the at least one user terminal upon a determination that a radio resource used for the D2D communication assigned from a first user terminal overlaps a radio resource used for the D2D communication assigned from a second user terminal;
in response to receiving the relief notification, the transmitter transmits a search request for a surrounding user terminal to the plurality of user terminals;
the receiver receives, from each of the plurality of user terminals, a search result based on the search request; and
the controller determines, on the basis of the search result, a user terminal which discovers a relatively large number of user terminals, from among the plurality of user terminals, to act as a scheduling terminal that performs an assignment of a radio resource used for the D2D communication; and
the transmitter transmits, to the user terminal determined as the scheduling terminal, a scheduling terminal request to request that the user terminal act as the scheduling terminal.

2. The base station according to claim 1, wherein
the controller determines another user terminal to which the radio resource is assigned from the scheduling terminal, from among the plurality of user terminals, and
the transmitter transmits, together with the scheduling terminal request, identification information of the another user terminal to the user terminal determined as the scheduling terminal.

3. The base station according to claim 1, wherein
the search request is a request to transmit a discovery signal used for discovering the surrounding user terminal, and
the receiver receives, as the search result, a reception result of the discovery signal and/or a reception result of a response to the discovery signal.

4. The base station according to claim 1, wherein
the controller designates, in response to determining two or more user terminals to act as the scheduling terminal, each of radio resources assignable by the two or more user terminals so that each of the radio resources assigned by the two or more user terminals does not overlap.

5. The base station according to claim 4, wherein
the two or more user terminals include a first user terminal and a second user terminal, and
the controller designates each of radio resources assignable by the first user terminal and the second user terminal so that each of the radio resources assigned by the first user terminal and the second user terminal does not overlap, only in response to a situation where a first group to which the first user terminal and a user terminal assigned with the radio resource from the first user terminal belong, and a second group to which the second user terminal and a user terminal assigned with the radio resource from the second user terminal belong, are adjacent.

6. The base station according to claim 1, wherein
the relief notification indicates that the at least one user terminal detects interference from another D2D communication.

7. The base station according to claim 1, wherein
the relief notification is transmitted in response to the first user terminal that performs the assignment of the radio resource changing, on the basis of assignment information of the radio resource of the second user terminal, assignment of the radio resource of the first user terminal.

8. A user terminal in a mobile communication system that supports D2D communication that is direct device-to-device communication, comprising:
a transmitter, a receiver and a controller, wherein
the receiver receives a relief notification from at least one user terminal out of a plurality of user terminals, wherein the relief notification is transmitted by the at least one user terminal upon a determination that a radio resource used for the D2D communication assigned from a first user terminal overlaps a radio resource used for the D2D communication assigned from a second user terminal;

the receiver receives, from the base station, a search request for a surrounding user terminal;

the controller starts searching the surrounding user terminal on the basis of the search request;

the transmitter transmits a search result of the surrounding user terminal to the base station;

the receiver receives a scheduling terminal request in response to the user terminal being determined, on the basis of the search result, to act as a scheduling terminal that performs an assignment of a radio resource used for the D2D communication, from among the plurality of user terminals, wherein the user terminal is determined to act as the scheduling terminal in response to the user terminal discovering a relatively large number of user terminals, and the scheduling terminal request requests the user terminal to act as the scheduling terminal.

9. The user terminal according to claim 8, wherein the receiver receives, together with the scheduling terminal request, identification information of another user terminal to which the radio resource is assigned by the user terminal.

10. The user terminal according to claim 8, wherein the search request is a request to transmit a discovery signal used for discovering the surrounding user terminal, and the transmitter transmits, as the search result, a reception result of the discovery signal and/or a reception result of a response to the discovery signal, to the base station.

11. The user terminal according to claim 8, wherein the transmitter transmits the relief notification to the base station in response to the controller detecting interference from the other D2D communication.

12. The user terminal according to claim 8, wherein the receiver receives assignment information on a radio resource used for the other D2D communication, and the transmitter transmits the relief notification to the base station in response to the controller changing, on the basis of the assignment information, the assignment of the radio resource assigned for D2D communication of the user terminal.

\* \* \* \* \*